United States Patent [19]

Sato

[11] Patent Number: 4,619,054

[45] Date of Patent: Oct. 28, 1986

[54] APPARATUS FOR PRODUCING REFRESHABLE DRY MEAT

[75] Inventor: Masami Sato, 29-3-401, Minamidai 2-Chome, Nakano-Ku, Tokyo, Japan

[73] Assignees: Stephano & Co., Ltd., Yokohama; Masami Sato, Tokyo, both of Japan

[21] Appl. No.: 782,598

[22] Filed: Sep. 30, 1985

Related U.S. Application Data

[62] Division of Ser. No. 570,848, Jan. 16, 1984, abandoned.

Foreign Application Priority Data

[30]

Nov. 4, 1983 [JP] Japan ................................ 58-205897

[51] Int. Cl.⁴ ........................... F26B 5/06; A23B 4/06
[52] U.S. Cl. ............................................. 34/92; 34/5; 219/354; 426/233; 426/242; 426/385
[58] Field of Search ............... 34/5, 92; 219/349, 354; 426/385, 241, 242, 233

[56] References Cited

U.S. PATENT DOCUMENTS

| 3,230,633 | 1/1966 | Hamilton | 34/5 |
| 3,262,212 | 7/1966 | Buhr | 34/5 |
| 3,271,874 | 9/1966 | Oppenheimer | 34/5 |

Primary Examiner—George Yeung
Attorney, Agent, or Firm—Spencer & Frank

[57] ABSTRACT

An equipment for producing refreshable dry meat comprising a vacuum chamber, an infrared ray heater emitting radiation having a wavelength of at least 5 μm, a vacuum pump for reducing the pressure in the vacuum chamber within the range 20 Torr to 1 Torr for cooling the chamber within the range −5° C. to −20° C. to effect vacuum-drying of the meat, a temperature sensor for detecting the temperature of the meat, a first temperature regulator coupling the temperature sensor to the infrared ray heater and a second temperature regulator coupled to the temperature sensor for terminating operation of the infrared ray heater when the temperature of the meat reaches a predetermined value.

4 Claims, 2 Drawing Figures

APPARATUS FOR PRODUCING REFRESHABLE DRY MEAT

This application is a division of application Ser. No. 570,848, filed Jan. 16th, 1984, now abandoned.

BACKGROUND OF THE INVENTION

1. Field of the Invention

This invention relates to an equipment for producing refreshable dry meat, and more particularly to an equipment for vacuum-drying edible raw animal meat such as beef, pork, mutton, and the like at a low temperature in such a manner that the thus dried meat is refreshable substantially to the state of raw meat before drying.

2. Description of the Prior Art

A number of methods for preserving edible meat by drying have been known: namely, non-restorable drying methods such as natural drying with solar energy and drying by blowing hot air over the food, and semi-restorable methods such as freeze-drying under vacuum conditions. However, none of the conventional methods for drying edible meat produce dry meat which can be restored to the quality equivalent to that of fresh meat before drying. More particularly, with the conventional methods of drying edible meat, the inside texture of the fresh meat is damaged in the process of drying, so that it is almost impossible to restore the thus dried meat to the conditions which closely resemble fresh meat. Thus, the use of dried meat prepared by conventional methods has been limited to those which do not require restoration to fresh meat, such as for canning.

Accordingly, there is a demand for a method for producing refreshable dry meat which upon rehydration closely resembles fresh meat (to be referred to as "refreshable dry meat" hereinafter). If any practicable methods for producing refreshable dry meat are found, preservation of edible meat for a long period of time becomes possible and the need for refrigerators and cold storage facilities would be greatly curtailed. Besides, the refreshable dry meat would weigh only about one third of fresh meat, so that transportation and storage of meat would be simplified to a considerable extent. Further, preservation of such refreshable dry meat by vacuum packing with a highly airtight film would provide one of the most useful preserved foodstuffs.

SUMMARY OF THE INVENTION

Therefore, an object of the present invention is to meet the above-mentioned demand, by providing a method of producing the refreshable dry meat by vacuum-drying edible raw meat, such as beef, pork, mutton, and the like, at a low temperature, so that the thus dried meat can be restored to fresh meat which is substantially the same as fresh meat in terms of flavour, toothsomeness, appearance, texture, and the like.

To fulfil the above object, a method of producing refreshable dry meat according to the present invention comprises the steps of placing raw meat to be dried on a shelf in a vacuum chamber having an infrared ray heater facing said shelf, freezing the meat at a certain temperature, and vacuum-drying the meat at a low temperature by applying infrared rays to the meat from the infrared ray heater so as to cause uniform heating from inside thereof while keeping the meat in a certain low temperature range so as to effect a constant rate drying of the meat.

In a preferred embodiment of the method of producing refreshable dry meat according to the invention, the above-mentioned vacuum-drying is effected by keeping the temperature of the infrared ray heater in a range of $+25°$ C. to $+200°$ C. depending on the distance from said heater to said meat, the kind of meat, and the desired duration of drying, while maintaining the temperature of said object-meat in a range of $-5°$ C. to $-20°$ C. during the constant rate drying and evacuating said vacuum chamber to 1.0 Torr to 20.0 Torr.

In another embodiment of the method of producing refreshable dry meat according to the invention, the above-mentioned constant rate drying is followed by a stage of decreasing rate drying and the above-mentioned application of the infrared rays from the infrared ray heater is terminated when the temperature of the meat is at $+20°$ C. to $+40°$ C. in the decreasing rate drying stage.

Another object of the invention is to provide an equipment for producing refreshable dry meat, comprising a vacuum chamber having a shelf adapted to carry meat to be dried, an infrared ray heater facing said shelf, and a cold trap disposed inside thereof; a vacuum pump operatively connected to said vacuum chamber; a refrigerator operatively connected to said cold trap in said vacuum chamber; a vacuum regulator adapted to control the operation of said vacuum pump; a temperature sensor means adapted to be inserted in said meat; a temperature regulator means adapted to regulate said infrared ray heater in response to an output from said temperature sensor means; a vacuum gauge means connected to said vacuum chamber so as to detect the vacuum pressure in said vacuum chamber; and a control means connected to both said vacuum gauge means and said vacuum regulator so as to actuate said vacuum regulator in response to an output from said vacuum gauge means, said temperature regulator means and said control means being adapted to keep said meat in a temperature range of $-5°$ C. to $-20°$ C. and the degree of vacuum in said vacuum chamber in a range of 1 Torr to 20 Torr so as to effect vacuum-drying of said meat at a low temperature.

An equipment for producing refreshable dry meat according to a preferred embodiment of the invention further comprises a recorder, which recorder is connected to the temperature sensor means for detecting the temperature of the meat and the vacuum gauge. The recorder may be further connected to the temperature regulator means and another temperature sensor for detecting the temperature of the cold trap.

BRIEF DESCRIPTION OF THE DRAWINGS

For a better understanding of the invention, reference is made to the accompanying drawings, in which.

Figure 1:
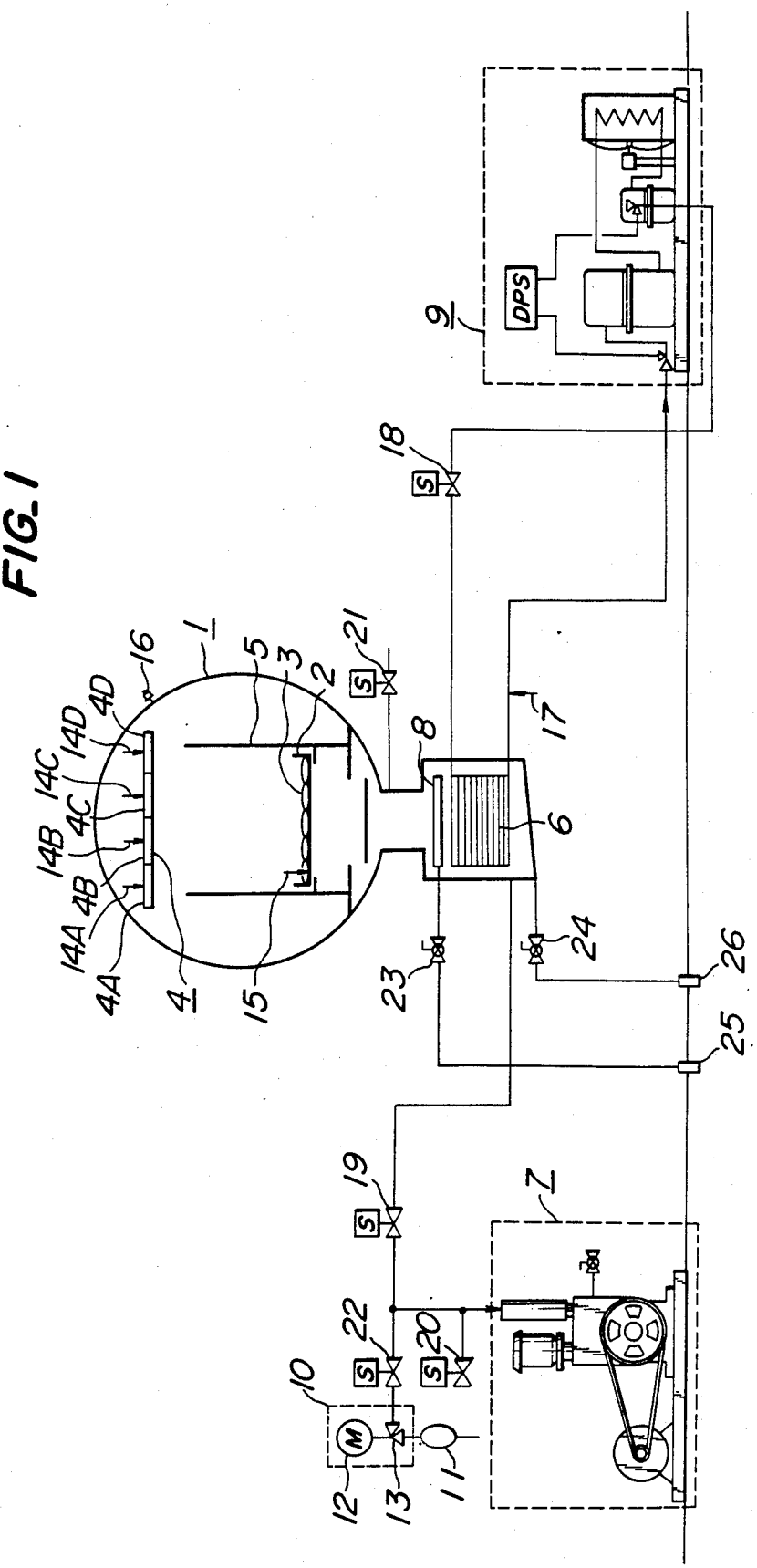
FIG. 1 is a schematic diagram which shows the structure of a vacuum-drying equipment having an infrared ray heater suitable for effecting the method according to the present invention.

Throughout the different views of the drawings, 1 is a vacuum chamber, 2 is a tray, 3 is the meat to be dried, 4 is an infrared ray heater, 4A through 4D are infrared ray plate heaters, 5 is a holder frame for the tray, 6 is a cold trap, 7 is an oil rotary vacuum pump, 8 is a water spray pipe, 9 is a small hermetic refrigerator, 10 is an automatic vacuum regulator, 11 is an air filter, 12 is a reversible motor, 13 is a vacuum pressure regulator valve, 14A through 14D are heating-temperature sensors, 15 is an object-temperature sensor, 16 is a vacuum gauge, 17 is a cooling-temperature sensor, 18 is a cold trap coolant valve, 19 is an evacuating valve, 20 is a vacuum pump leak valve, 21 is a vacuum chamber leak valve, 22 is a vacuum pressure regulator valve, 23 is an ice-melting water valve, 24 is a drain valve, 25 is an inlet for ice-melting water, 26 is a drain hole, 27 is a Pirani gauge, 28 is a control means, 29 is a recorder, and 30 through 34 are temperature regulators.

DESCRIPTION OF THE PREFERRED EMBODIMENTS

The method of the present invention is a kind of vacuum-drying process at a freezing temperature, or freeze-drying process under vacuum conditions. As well known, in these processes, the object to be dried or dehydrated is frozen at a temperature in a range of for instance $-30°$ C. to $-40°$ C. and then placed in a vacuum vessel so as to apply the heat necessary for evaporation of the moisture under the vacuum conditions, whereby the object is dried by direct sublimation of the moisture therefrom. In the method of the invention, an infrared ray heater is used as the heat source for the evaporation of the moisture from the frozen object (i.e., the meat to be dried) in the above-mentioned freeze-drying process under vacuum conditions.

More particularly, noting that the principle for drying used in the freeze-drying process under vacuum conditions is most suitable for drying raw meat, the inventors have carried out a series of tests to improve the method. As a result, they discovered that when an infrared ray heater was used as a heat source for heating the frozen raw meat, especially when infrared rays with a long wavelength of longer than 5-6 $\mu$m were irradiated onto a frozen raw meat for uniform heating from the inside thereof, the vacuum-drying of such frozen meat produced refreshable dry meat which could be restored to substantially the same quality as that of the original fresh meat before the drying. The present invention is based on such finding of the inventors.

In one of the preferred embodiments of the method according to the present invention, the following operating conditions of the freeze-vacuum-drying process are found favorable: namely, the freezing temperature of the edible meat to be dried during a constant rate drying stage is in a range of $-5°$ C. to $-20°$ C.; and the heating temperature of the infrared ray heater is in a range of $+25°$ C. to $+200°$ C. depending on the kind of the meat, the desired duration of drying, and the distance from the infrared ray heater to the meat; and the vacuum pressure in the vacuum chamber during the constant rate drying stage is in a range of 1 Torr to 20 Torr.

During the constant rate drying stage of the method according to the present invention, the energy of the electromagnetic waves from the infrared ray heater are all consumed as the latent heat for the evaporation of the moisture of the meat. Thus, the temperature of the meat is not raised during the constant rate drying stage, and the drying operation proceeds while keeping the meat at the freezing temperature as mentioned above.

When the moisture content of the meat is reduced to a certain level, the operation enters into a decreasing rate drying stage, in which a part of the energy of the electromagnetic waves from the infrared ray heater is used as the sensible heat for gradually raising the temperature of the meat. When the moisture content of the meat reaches a certain equilibrium point, the entire energy of the electromagnetic waves from the infrared ray heater contributes to the temperature rise of the meat.

To avoid any change of the texture of the fresh meat being dried, the irradiation of the infrared rays onto the meat is terminated when the temperature of the meat is raised to a temperature which is high enough for satisfactory drying but low enough not to cause a detrimental effect on the texture of the fresh meat, such as dissolution and denaturing of the protein contained in the meat, which temperature is for instance in a range of $+20°$ C. to $+40°$ C. The stopping of the irradiation may be effected by interrupting the power supply to the infrared ray heater. The heating time necessary for achieving the satisfactory drying of the meat varies considerably depending on various factors; such as the size of the equipment for the drying, the distance from the infrared ray heater to the meat, the heating temperature of the infrared ray heater, the kind and thickness of the meat, and the like. In the examples to be described hereinafter, the heating time was about 8-12 hours.

The weight of the dry meat produced by the method of the invention was about one third that of the fresh meat before drying, and the dry meat thus produced was restored to substantially the same fresh conditions as before drying simply by dipping or immersing the dry meat in water at room temperature. The dry meat absorbs moisture when dipped in water at room temperature and substantially restores the original texture.

EXAMPLES

A piece of fresh meat was placed on a tray carried by a shelf disposed in a vacuum chamber having an infrared ray heater facing the shelf, and the meat was frozen by a cold trap which was disposed in the vacuum chamber and connected to a refrigerator. The inside of the vacuum chamber was evacuated to a desired degree of vacuum by a vacuum pump. The meat was then freeze-dried under the vacuum conditions by using the infrared ray heater. The details of the drying process used will be described hereinafter. A part of the result is shown in Table 1.

In the Examples of Table 1, the infrared ray heater in the vacuum chamber was formed of four infrared ray plate heaters disposed side by side, each of the plate heaters having a surface area of 300 mm (width)×140 mm (length) and a rated capacity of 400 W. In each of the Examples of Table 1, ten pieces of meat to be dried were placed on an iron tray and loaded in the vacuum chamber, each piece of the meat being a beef load with a surface area of about 10 cm$^2$ and a thickness of about 2 cm. The meat was frozen by actuating a cold trap disposed in the vacuum chamber, and when the average temperature of the beef loaf reached a predetermined freezing temperature, the infrared ray heater was energized to heat the meat at a predetermined heating temperature.

In each of the Examples, after the interruption of power supply to the infrared ray heater, the meat thus dried was left under the vacuum conditions for a while, and then the pressure in the vacuum chamber was raised to atmospheric pressure to remove the dry meat to the outside. The dry meat of the three Examples weighed about one third of that before drying, and the dried conditions of the dry meat were good.

TABLE 1

| Item | Example 1 | Example 2 | Example 3 |
|---|---|---|---|
| meat freezing temperature | −10° C. | −10° C. | −10° C. |
| Heating temperature of infrared ray heater | +75° C. | +50° C. | +100° C., 4 hrs later +75° C. |
| Distance from heater to meat | 20 cm | 30 cm | 15 cm |
| Specimen temperature* | +25° C. | +20° C. | +25° C. |
| Pressure in the vacuum chamber | 2 Torr | 3 Torr | 1-1.8 Torr |
| Cooling temperature of cold trap | −35° C. | −35° C. | −28° C. |

Note:
*"Specimen temperature" refers to that temperature of the meat at which heating in the decreasing rate drying stage is terminated. The same will apply to the succeeding description.

The dry beef prepared by each of the above Examples was restored by immersing it in water of room temperature for about one hour. With the naked eye, the thus restored beef appeared substantially the same as fresh beef before drying. The restored beef was cooked in the same manner as that of fresh meat and then tasted. As a result, the dry meat was found to have substantially the same flavor and toothsomeness as that of fresh meat.

Analysis of the dissolution and denature of protein and the like in the dry beef prepared by Example 1 was carried out, in comparison with that of fresh beef, by a Foundational Juridical Person "JAPAN THERAPEUTIC FOOD ASSOCIATION". The result is shown in Table 2.

More particularly, Table 2 relates to nitrogen content in the meat in general, and more particularly to the measurement concerning presence or absence of water-soluble heat coagulated nitrogen in the Specimens A and B prepared by the method of the invention, which heat coagulated nitrogen should not be contained in the fresh meat. The heat coagulation could occur from nitrogen contained in the fresh beef. Table 2 shows test results of both the Specimens prepared by the method of the invention and fresh beef before the drying.

TABLE 2

| Specimen | Water-soluble coagulated nitrogen, in % of total nitrogen* |
|---|---|
| Specimen A | 12.0% (13.46 mg/112.1 mg) |
| Specimen B | 11.7% (13.71 mg/117.2 mg) |
| Fresh beef | 13.1% (3.93 mg/29.95 mg) |

Note:
*Bracketed values show water-soluble heat coagulated nitrogen in mg/total nitrogen in mg.

In Table 2, the measured value of the water-soluble coagulated nitrogen for the fresh beef was taken after evaporating the fresh beef for 10 minutes so as to cause the heat coagulation.

As can be seen from Table 2, for 100 parts of water-soluble heat coagulated nitrogen contained in the fresh beef and produced upon heating, the mean amount of the water-soluble heat coagulated nitrogen in each of the Specimens A and B produced by the method of the invention was 90.5, so that the Specimens A and B differ only little from the fresh beef. This means that, in either of the Specimens A and B, the protein is almost completely insoluble, so that both Specimens were dried in a state which is substantially close to the fresh meat.

To check the meat texture, the Specimens A and B of Table 2 were immersed in distilled water overnight for rehydration thereof, and the rehydrated Specimens were cut into thin flakes by a freeze microtome and dyed by eosine. The following conclusions were reached by the examination of the thus dyed flakes of the Specimens.

(1) The microscopic examination showed muscular fiber disposition which was similar to that of the fresh meat, and it was confirmed that no heat coagulated substances were found between adjacent muscular fibers, that no increase of inter-fiber gap due to heat shrinkage of the muscular fibers was noted, and that no dissolution of fat was found.

(2) The naked eye examination showed that both of the Specimens A and B were fully rehydrated so as to retain the moisture in good condition, and that the rehydrated Specimens were hard to tear by hand and if they were forcibly torn off membranes between the muscular fibers were broken and looked like threads. This means that the muscular fiber texture of the Specimens A and B were about the same as that of the fresh beef.

The results of the above-mentioned chemical analyses and histological examinations provide scientific evidences of the effect of the method of the present invention.

As a result of a large number of experiments, the inventors found that the same effects as those of the Examples 1 through 3 could be obtained by using the following conditions; namely, the heating temperature of the infrared ray heater in a range of +25° C. to +200° C., the freezing temperature of the meat in a range of −5° C. to −20° C., and the degree of vacuum in the vacuum chamber in a range of 1.0 Torr to 20.0 Torr. Thus, the method of the invention is not restricted to the Examples 1 through 3.

An equipment for vacuum-freeze-drying with an infrared ray heater which is most suitable for carrying out the method of the invention will be described now.

FIG. 1 schematically illustrates the structure of the equipment for vacuum-freeze-drying of meat according to the invention. A vacuum chamber 1 has a tray 2 which is made of a metal screen, an aluminum plate, or an iron plate. The tray 2 carries meat 3 to be dried, and an infrared ray heater 4 is mounted within the vacuum chamber 1 so as to face the meat 3 on the tray 2 for heating the meat 3. In the illustrated embodiment, the heater 4 has four infrared ray plate heaters 4A, 4B, 4C, and 4D disposed side by side. The tray 2 is movably mounted on a holder frame 5, so that the distance from the infrared ray heater 4 to the meat 3 is adjustable. If necessary a plurality of trays 2 may be mounted on the holder frame 5, for instance one above the other.

A cold trap 6 is disposed in the lower inside portion of the vacuum chamber 1, so as to cool the meat 3 on the tray 2 to a desired freezing temperature. The cold trap 6 also acts to condense moisture in the vacuum chamber 1, as moisture of the frozen meat 3 is evaporated by the heat rays from the infrared ray heater 4, so that as the meat 3 is dried the moisture from it is collected at the surface of the cold trap 6 by the above condensation. The moisture condensation by the cold trap 6 and evacuation by an oil rotary vacuum pump 7 act to maintain a high degree of vacuum in the vacuum chamber 1. An ice-melting water spray pipe 8 is disposed immediately above the cold trap 6 to spray water toward the cold trap 6 for removing ice formed on the surface thereof with the thus sprayed water. A small hermetic refrigerator 9 disposed outside the vacuum chamber 1 cools the cold trap 6.

An automatic vacuum regulator 10 is connected to the evacuation piping of the oil rotary vacuum pump 7, so as to keep a predetermined desirable degree of vacuum in the vacuum chamber 1. The automatic vacuum regulator 10 includes, for instance, a vacuum pressure regulator valve 13 driven by a reversible motor 12, which valve 13 selectively introduces outside air into the vacuum chamber 1 through an air filter 11 in response to the rotation of the reversible motor 12. The automatic vacuum regulator 10 controls the reversible motor 12 in response to the degree of vacuum in the vacuum chamber 1, so as to maintain the degree of vacuum therein at a desired level.

To check the heating temperature, heating-temperature sensors 14A through 14D are mounted on the individual infrared ray plate heaters 4A through 4D, respectively. A specimen-temperature sensor 15 and meat-temperature sensors 15A through 15E are inserted into the meat 3 on the tray 2 at positions best suited for the detection of the temperature of the meat 3. Further, a vacuum gauge 16 is mounted on the vacuum chamber 1 so as to detect the vacuum pressure therein, and a cooling-temperature sensor 17 is mounted on the piping of the coolant so as to detect the cooling-temperature of the cold trap 6. A series of valves are provided on various pipings; namely, a cold trap valve 18, an evacuating valve 19 for the vacuum chamber 1, a vacuum pump leak valve 20, a vacuum chamber leak valve 21, vacuum pressure regulator valve 22, an ice-melting water supply valve 23, and a drain valve 24. The ice-melting water is fed through an ice-melting water inlet 25, and the water from the drain valve 24 is discharged through a drain hole 26.

Figure 2:
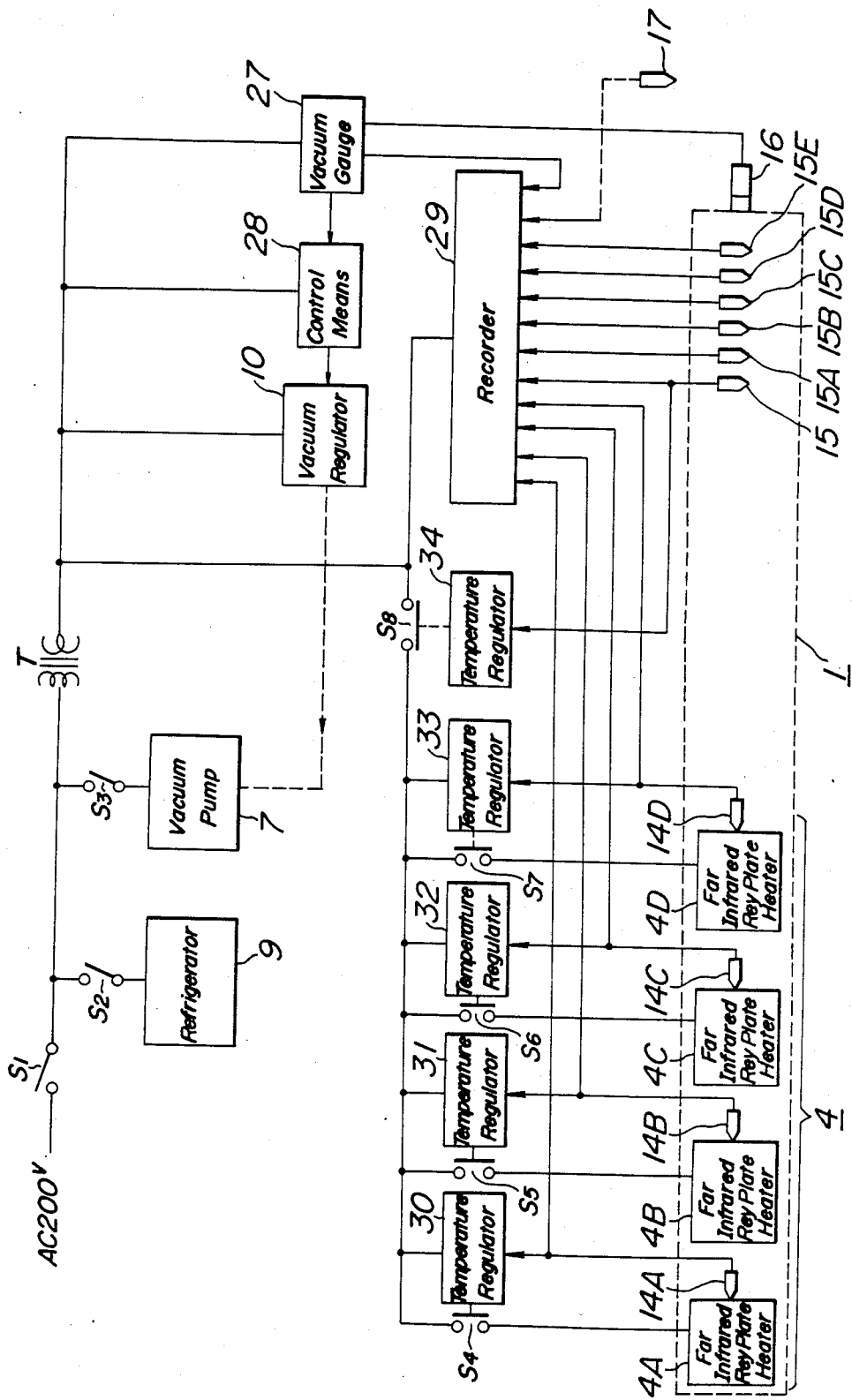
FIG. 2 is a block diagram showing both the electric system and the sensor-actuated control system of the equipment of FIG. 1.

FIG. 2 shows a block diagram of the electric power supply system and the control system of the vacuum-freeze-drying equipment of FIG. 1, which equipment has the infrared ray heater and sensors as shown in the figure. A main switch $S_1$ controls the power supply to the control system. Power source switches $S_2$ and $S_3$ control actuation of the refrigerator 9 and the vacuum pump 7, respectively. In the illustrated embodiment, a transformer T with terminal voltages of 200 V/100 V is used between the power circuits and the control circuits. A Pirani gauge 27 has a setter which can be set for a desired range of the degree of vacuum, and in response to the output signal from the vacuum gauge 16 representing the sensed degree of vacuum, the Pirani gauge 27 produces an information signal indicating whether the sensed degree of vacuum is within or above or below a desired range as stored in the setter thereof. In response to the information signal from the Pirani gauge 27, a control means 28 connected thereto acts on the automatic vacuum regulator 10, for instance by actuating the reversible motor 12 so as to properly drive the vacuum pressure regulating valve 13 to maintain the desired degree of vacuum in the vacuum chamber 1. The control means 28 may be formed of a series of relays and the vacuum pressure regulating valve 13 may be a needle valve.

Preferably, a recorder 29 is provided, so that a record is kept covering the heating-temperatures of the individual infrared ray plate heaters 4A through 4D, the specimen-temperature and the temperature of the meat 3, the cooling-temperature of the cold trap 6, and the degree of vacuum of the vacuum chamber 1. To this end, the recorder 29 of the illustrated embodiment is connected to the temperature sensors 14A through 14D mounted on the infrared ray plate heaters 4A through 4D, the specimen-temperature sensor 15, the meat-temperature sensors 15A through 15E, the cooling-temperature sensor 17 mounted on the cold trap 6, and the Pirani gauge 27.

Temperature regulators 30 through 33 are connected to the heating-temperature sensors 14A through 14D, respectively, so that the regulators 30 through 33 produce ON-OFF signals in response to the output from the above temperature sensors for keeping the infrared ray plate heaters 4A through 4D at desired heating-temperatures. More particularly, each of the temperature regulators 30 through 33 has a setter on which the desired heating-temperature is selectively set, so that the regulators 30 through 33 compare the sensed temperatures of the corresponding infrared ray heaters 4A through 4D against the desired temperatures set on the setters thereof and produce the ON-OFF signals depending on the result of the comparisons. Such ON-OFF signals controls the electromagnetic switches $S_4$ through $S_7$ in the power source circuits of the infrared ray plate heaters 4A through 4D, so as to control the heat generation by the heaters in response to the comparisons at the temperature regulators 30 through 33 by regulating the power supply thereto.

Another temperature regulator 34 having a similar structure to that of the above temperature regulators 30 through 33 is connected to the specimen-temperature sensor 15. In the illustrated embodiment, the temperature regulator 34 has a setter on which the desired level of the specimen temperature (see Table 1) is selectively set, so that the output from the specimen-temperaure sensor 15 is compared against the thus set desired level thereof. Depending on the result of the comparison, the temperature regulator 34 controls the ON-OFF conditions of an electromagnetic switch $S_8$ which makes or breaks the common power circuit for all the infrared ray plate heaters 4A through 4D. Thus, if a certain specimen temperature is set on the temperature regulator 34, when the temperature of the meat 3 is raised to the thus set specimen temperature while being processed in the decreasing rate drying stage, the heating by the infrared ray plate heaters 4A through 4D is automatically interrupted and any excessive drying due to overheating is prevented.

To carry out the method of the invention by using the vacuum-drying equipment with infrared ray heating as illustrated in FIG. 1 and FIG. 2, meat 3 to be dried, such as edible fresh meat, is loaded on the tray 2 in the vacuum chamber 1 of FIG. 1. In the illustrated embodiment, the meat 3 consists of a number of meat loaves, and the specimen-temperature sensor 15 and the meat temperature sensors 15A through 15E are inserted in the fresh meat loaves of the meat 3. After the above preparation is completed, the refrigerator power source switch $S_2$ is turned on, so as to run the small hermetic refrigerator 9 for starting the cooling of the cold trap 6. Meanwhile, the Pirani gauge 27 is set at a desired degree of vacuum in the range of 1.0 Torr to 20.0 Torr. When the temperature of the cold trap 6 is reduced to below −30° C., the vacuum pump power source switch $S_3$ is turned on to run the vacuum pump 7. At the same time, the vacuum chamber evacuating valve 19 and the vacuum pressure regulator valve 22 are opened. Then, the temperature regulator 34 for preventing the overheating of the meat 3 is set at a desired level in a range of +20° C. to +40° C. Finally, the desired heating-temperatures for the infrared ray plate heaters 4A through 4D are set on the temperature regulators 30 through 33 therefor in a range of +25° C. to +200° C.

When the meat 3 is dried to the desired degree, the temperature regulator 34 automatically turns off the power supply to the infrared ray plate heaters 4A through 4D. After confirming the turning off of the switch $S_8$, the automatic vacuum regulator 10, the vacuum chamber evacuating valve 19, and the switch $S_3$ of the vacuum pump 7 are turned off, and the vacuum chamber leak valve 21 is opened for restoring the atmospheric pressure in the vacuum chamber 1. Then, the refrigerator power source switch $S_2$ is turned off and the door (not shown) of the vacuum chamber 1 is opened for removing the dried meat 3 therefrom.

As described in detail in the foregoing, the method of producing the refreshable dry meat according to the present invention uses infrared ray for freeze-drying meat under vacuum conditions, so that the following outstanding effects are achieved.

(1) The use of the infrared ray for heating the frozen object-meat under vacuum conditions causes uniform heating deep inside the meat, and the vacuum-drying of the meat at freezing temperatures is effected. Thus, the blood, protein, and fat in the meat, such as edible fresh meat, are retained even after the drying without dissolution and denaturing, and only the moisture in the meat is removed, so that refreshable dry meat with a porous texture is produced.

(2) Accordingly, the method of the invention produces refreshable dry meat which can be restored to fresh meat simply by immersing it in water of room temperature, and the thus restored fresh meat has substantially the same taste, flavour, toothsomeness, appearance, and texture as those before the drying.

(3) The refreshable dry meat produced by the method of the invention weighs only about one third of raw meat before drying, so that considerable saving in the transportation cost can be expected by the use of the method of the invention. Besides, if the refreshable dry meat thus prepared is vacuum-packed with a fully airtight film, it can be preserved for a very long period of time, or semi-permanently, without necessitating any refrigerated storage. In short, the method of the invention has an outstandingly high economic merit.

(4) As compared with conventional method of freezing meat requiring a very low freezing temperature of the meat, the method of the invention needs only −5° C. to −20° C. which is higher than that of the conventional method, so that the running cost of the equipment for carrying out the method of the invention is low. Thus, the method of the invention is economical in terms of the running cost.

Although the invention has been described with a certain degree of particularity, it is understood that the present disclosure has been made only by way of example, and that numerous changes in details of construction and the combination and arrangement of parts may be resorted to without departing from the scope of the invention as hereinafter claimed.

What is claimed is:

1. An equipment for producing refreshable dry meat comprising:

a vacuum chamber having a tray therein for supporting meat to be processed;

an infrared ray heater located within said vacuum chamber spaced from and facing said tray for irradiating said meat, said infrared heater emitting radiation having a wavelength of at least 5 μm;

a vacuum pump connected to said vacuum chamber for reducing the pressure therein to a value within the range 20 Torr to 1 Torr for cooling said vacuum chamber to a temperature within the range −5° C. to −20° C., thereby effecting vacuum-drying of said meat at a temperature within said temperature range;

a cold trap disposed within said vacuum chamber for condensing moisture evaporated from said meat by the radiation emitted from said infrared heater, thereby accelerating reduction of the pressure within said chamber;

a refrigerator coupled to said cold trap for cooling said cold trap;

a vacuum regulator for maintaining the vacuum within said chamber within said pressure range;

temperature sensor means for insertion in said meat to detect the temperature thereof;

first temperature regulator means coupling said temperature sensor means to said infrared ray heater, said first temperature regulator means controlling the temperature of said infrared ray heater in accordance with the detected temperature of said meat, the temperature of said infrared ray heater being controlled in a range of +25° C. to +200° C.;

second temperature regulator means coupled to said temperature sensor means for terminating the operation of said infrared ray heater when the temperature of said meat reaches a predetermined value in a range of +20° C. to +40° C., said predetermined value being a temperature high enough to dry said meat and low enough not to detrimentally affect the texture of said meat;

vacuum gauge means connected to said vacuum chamber for detecting the pressure therein; and control means coupling said vacuum gauge to said vacuum regulator, said vacuum being actuated to maintain a vacuum within said vacuum chamber to between 20 Torr and 1 Torr in accordance with the pressure detected by said vacuum gauge means, whereby the temperature of said vacuum chamber is maintained within the range of −5° C. to −20° C.

2. An equipment for producing refreshable dry meat as set forth in claim 1, wherein said equipment further comprises a recorder connected to said vacuum gauge means and said temperature sensor means for recording the temperature of said meat.

3. An equipment for producing refreshable dry meat as set forth in claim 2, wherein said recorder is further connected to said temperature regulator means.

4. An equipment for producing refreshable dry meat as set forth in claim 1, wherein said equipment further comprises switching means coupled to said temperature regulator means, said switching means controlling the supply of power to said infrared ray heater.

* * * * *